United States Patent
Shimatani et al.

(10) Patent No.: US 7,946,602 B2
(45) Date of Patent: May 24, 2011

(54) STABILIZER

(75) Inventors: Hiroyuki Shimatani, Toyota (JP);
Satoshi Murata, Miyoshi (JP); Seiji Sakai, Toyota (JP); Masao Tajima, Toyota (JP); Makoto Kobayashi, Toyota (JP); Keiichi Kondo, Toyota (JP); Shinji Iwasa, Toyota (JP); Kimihiro Kuji, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 78 days.

(21) Appl. No.: 12/065,732

(22) PCT Filed: Jul. 4, 2006

(86) PCT No.: PCT/JP2006/313638
§ 371 (c)(1),
(2), (4) Date: Mar. 5, 2008

(87) PCT Pub. No.: WO2007/029413
PCT Pub. Date: Mar. 15, 2007

(65) Prior Publication Data
US 2009/0160155 A1     Jun. 25, 2009

(30) Foreign Application Priority Data

Sep. 9, 2005  (JP) .................................. 2005-262326

(51) Int. Cl.
*B60G 21/055*    (2006.01)
(52) U.S. Cl. .............................................. 280/124.152
(58) Field of Classification Search ........... 280/124.106, 280/124.107, 124.137, 124.152, 124.166
See application file for complete search history.

(56) References Cited

U.S. PATENT DOCUMENTS

| | | | | |
|---|---|---|---|---|
| 2,660,449 A * | 11/1953 | Macpherson | .......... | 280/124.149 |
| 2,674,450 A * | 4/1954 | Frank | .............................. | 267/189 |
| 3,864,989 A * | 2/1975 | Jones | ............................ | 74/498 |
| 4,033,605 A * | 7/1977 | Smith et al. | ................ | 280/6.157 |
| 4,066,278 A * | 1/1978 | Takagi | .................... | 280/124.152 |
| 4,113,278 A * | 9/1978 | Rissberger | ............. | 280/124.106 |
| 4,153,272 A * | 5/1979 | Fiedler et al. | .......... | 280/124.106 |
| 4,249,753 A * | 2/1981 | Froumajou | .................... | 280/790 |
| 4,565,389 A * | 1/1986 | Kami et al. | ............. | 280/124.137 |
| 5,217,245 A * | 6/1993 | Guy | ....................... | 280/124.152 |
| 5,496,055 A * | 3/1996 | Shibahata et al. | ..... | 280/124.141 |
| 5,685,527 A * | 11/1997 | Harbali et al. | ................ | 267/277 |
| 5,782,484 A * | 7/1998 | Kuhn, Jr. | ................ | 280/124.142 |
| 5,833,026 A * | 11/1998 | Zetterstrom et al. | .......... | 180/360 |
| 5,934,696 A * | 8/1999 | Bloser et al. | ........... | 280/124.106 |
| 6,017,044 A * | 1/2000 | Kawagoe | ............... | 280/124.106 |
| 6,089,582 A | 7/2000 | Hasshi | | |
| 6,616,161 B2 * | 9/2003 | Hamada et al. | ........ | 280/124.149 |
| 6,752,408 B2 * | 6/2004 | La | ........................... | 280/124.135 |
| 7,322,591 B2 * | 1/2008 | Seki | ....................... | 280/124.152 |

(Continued)

FOREIGN PATENT DOCUMENTS

DE    103 04 486    8/2004

(Continued)

*Primary Examiner* — Paul N Dickson
*Assistant Examiner* — Robert A Coker
(74) *Attorney, Agent, or Firm* — Oblon, Spivak, McClelland, Maier & Neustadt, L.L.P.

(57) ABSTRACT

A stabilizer configured to connect suspension devices situated right and left of an automobile, the stabilizer is characterized in that the stabilizer extends below a suspension member where a steering device of the automobile is fixed; at a side of the suspension member, the stabilizer extends above a lower arm and toward a front of the automobile; and the stabilizer is connected to the suspension devices.

13 Claims, 6 Drawing Sheets

U.S. PATENT DOCUMENTS

| | | | |
|---|---|---|---|
| 2002/0074761 A1* | 6/2002 | Kincaid et al. | 280/124.152 |
| 2004/0140640 A1* | 7/2004 | Frantzen et al. | 280/124.107 |
| 2005/0073126 A1* | 4/2005 | Seki | 280/124.152 |
| 2006/0208448 A1* | 9/2006 | Dundon | 280/124.152 |

FOREIGN PATENT DOCUMENTS

| | | |
|---|---|---|
| DE | 10 2004 054 853 | 5/2006 |
| EP | 0 270 406 | 6/1988 |
| EP | 270406 A1 * | 6/1988 |
| EP | 0 301 219 | 2/1989 |
| FR | 2 859 411 | 3/2005 |
| JP | 4 27615 | 1/1992 |
| JP | 4 368210 | 12/1992 |
| JP | 06 099719 | 4/1994 |
| JP | 2003 112511 | 4/2003 |
| JP | 2005 206121 | 8/2005 |

\* cited by examiner

STABILIZER

TECHNICAL FIELD

The present invention generally relates to stabilizers configured to prevent rolling of automobile bodies. More specifically, the present invention relates to a stabilizer whereby a layout having little limitation with peripheral main parts can be realized.

BACKGROUND ART

A suspension device having the following structure has been conventionally known. That is, a pair of wheel supporting members is disposed right and left of a car body, respective wheel supporting members are coupled rotatably about a vertically extended rotation shaft, and a driving device is coupled to the wheel supporting members. In driving, a push rod for upwardly displacing the turning outer wheel side of a torsion bar type stabilizer and downwardly displacing the turning inner wheel side connects the ends of the torsion bar type stabilizer to respective wheel supporting members. (See Japanese Laid Open Patent Application Publication No. 2003-112511.)

However, in a structure where the stabilizer extends ahead of a steering gear box such as discussed in the above-mentioned conventional art, arrangement of the stabilizer is limited due to a relationship with an engine or a transmission provided ahead of the steering gear box. Therefore, under this structure, except a case where a small size engine or transmission is installed, it is difficult to provide the stabilizer by an efficient layout.

On the other hand, in a structure where the stabilizer extends behind the steering gear box, the arrangement of the stabilizer is not limited due to the relationship with the engine or the transmission. However, the arrangement of the stabilizer is limited in an area where the stabilizer crosses the front side member due to a relationship with a bending part (downward tilt part) of the front side member. Therefore, under this structure, except for a case where a large bending part being not advantageous from the perspective of strength is formed in the front side member, it is difficult to form the stabilizer with an efficient layout.

DISCLOSURE OF THE INVENTION

Accordingly, in a preferred embodiment of the present invention there is provided a novel and useful stabilizer solving one or more of the problems discussed above.

According to one aspect of the present invention there is a stabilizer efficiently provided by at least reducing limitations generated due to a positional relationship with an engine or a transmission or limitations generated due to a positional relationship with a front side member.

An embodiment of the present invention is achieved by a stabilizer configured to connect suspension devices situated right and left of an automobile, characterized in that: the stabilizer extends below a suspension member where a steering device of the automobile is fixed; at a side of the suspension member, the stabilizer extends above a lower arm and toward a front of the automobile; and the stabilizer is connected to the suspension devices.

The stabilizer may also be characterized in that: at the side of the suspension member, the stabilizer extends toward the front of the automobile more than a center of an axle shaft of the automobile; and the stabilizer is connected to a front side part of a strut of the suspension device via a link member. The stabilizer may also be characterized in that: the stabilizer passes substantially right under a gear box of the steering device or toward the front side of the automobile.

According to the embodiment of the present invention, it is possible to efficiently provide the stabilizer by at least reducing the limitations generated due to the positional relationship with the engine or the transmission or the limitations generated due to the positional relationship with the front side member.

Other objects, features, and advantages of the present invention will become more apparent from the following detailed description when read in conjunction with the accompanying drawings.

BEST MODE FOR CARRYING OUT THE INVENTION

A description will now be given, with reference to FIG. 1 through FIG. 6, of embodiments of a stabilizer of the present invention.

Figure 1:
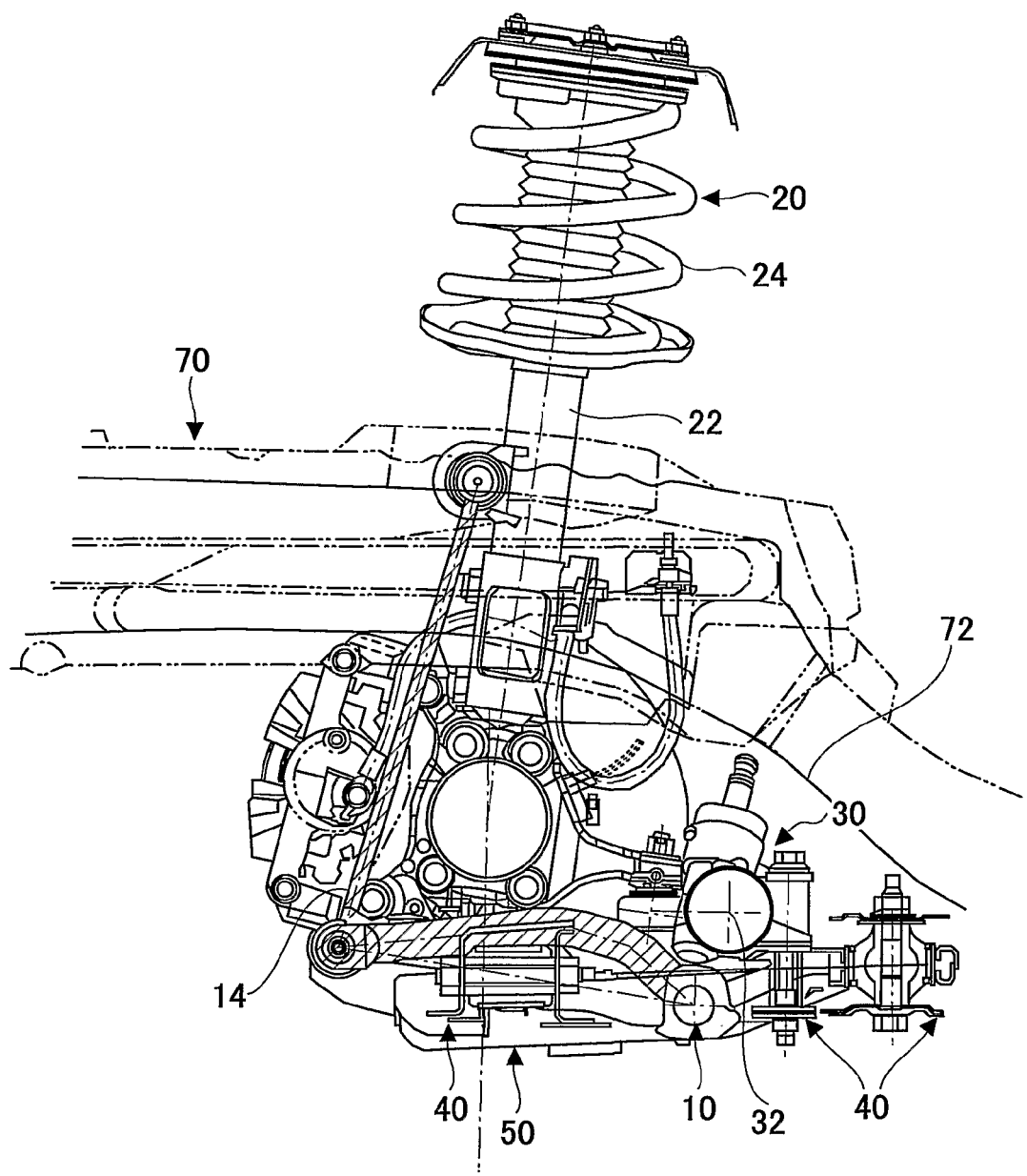
FIG. 1 is a side view of a front suspension where a stabilizer 10 of an embodiment of the present invention is applied.
Figure 2:
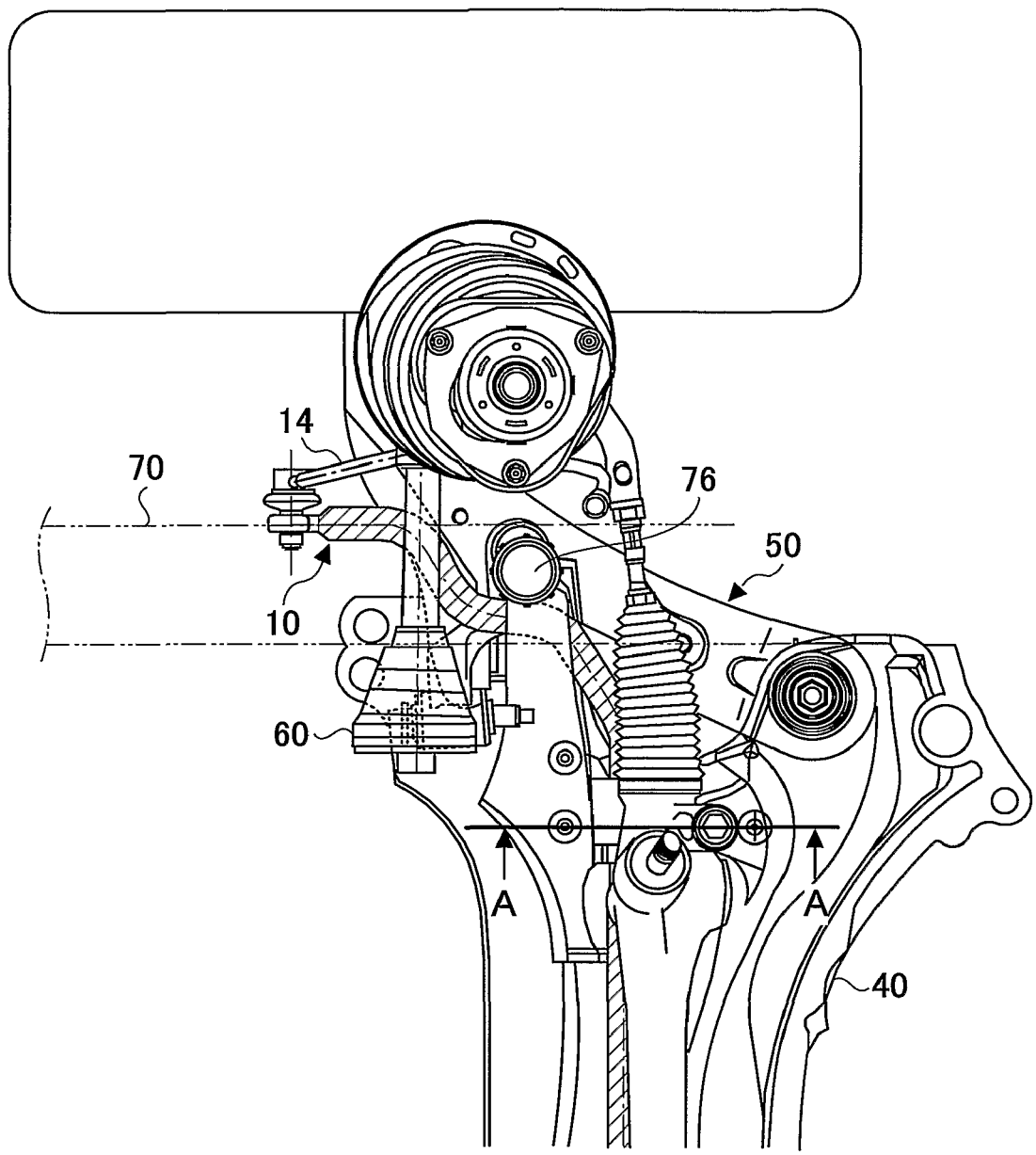
FIG. 2 is a plan view of the front suspension where the stabilizer 10 of the embodiment of the present invention is applied.
Figure 3:
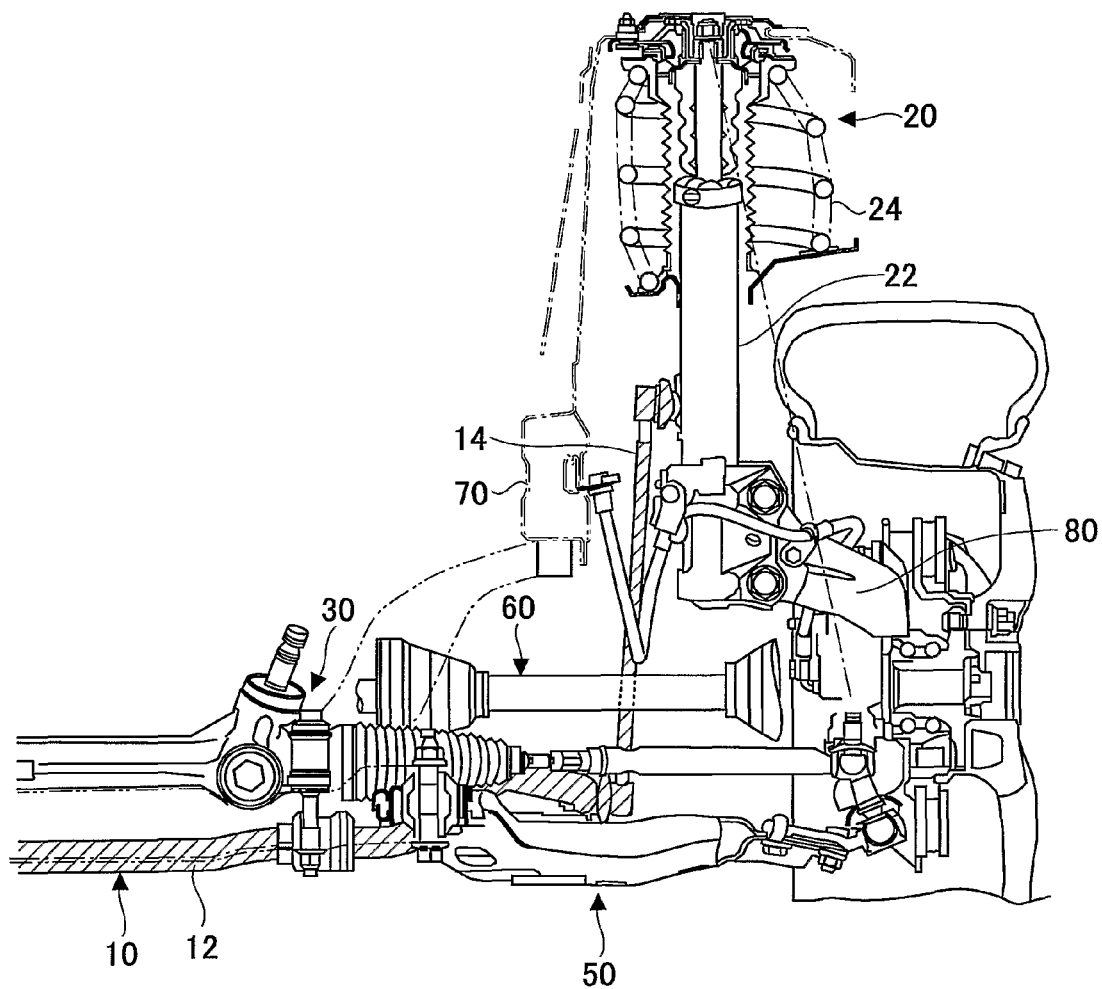
FIG. 3 is a rear view of the front suspension where the stabilizer 10 of the embodiment of the present invention is applied.

Each of FIG. 1 through FIG. 3 shows the main structure of a front suspension (right wheel) where an example of a stabilizer 10 of the present invention is applied. More specifically, FIG. 1 is a side view whose left side is toward the front end of an automobile. FIG. 2 is a plan view and FIG. 3 is a rear view.

The stabilizer 10 is a device configured to attenuate a roll at the time when the automobile is turned, for example. The stabilizer 10 in this example is a torsion bar type stabilizer. The stabilizer 10 includes a stabilizer bar 12 extending in right and left directions of the automobile. The end parts of the stabilizer bar 12 are connected to corresponding right and left suspension devices 20 via corresponding stabilizer links 14. The stabilizer link 14 may be a ball joint type.

The stabilizer 10 of the embodiment of the present invention includes the following three structures, that is, (1) the stabilizer 10 extends below the suspension member 40 where a steering device 30 of the automobile is fixed;
(2) at a side of the suspension member 40, the stabilizer 10 extends above a lower arm 50 and toward the front of the automobile; and
(3) the stabilizer 10 is connected to the right and left suspension devices 20.

Each of detailed structures is discussed below.

Figure 4:
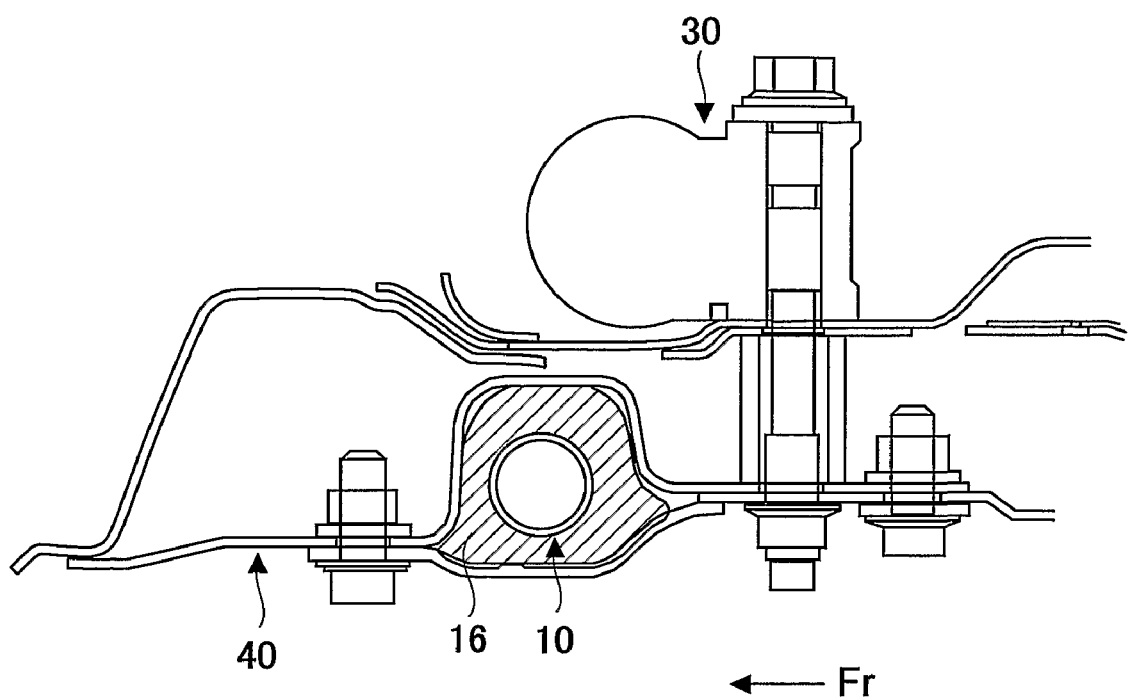
FIG. 4 is a cross-sectional view taken along a line A-A of FIG. 2.

The structure of (1) is well shown in FIG. 4. Here, FIG. 4 is a cross-sectional view taken along a line A-A of FIG. 2.

As shown in FIG. 4, the stabilizer 10 passes in a concave part formed at a lower side of the suspension member 40 and extends in right and left directions.

In the vicinities of the right and left ends of the suspension member 40, the stabilizer 10 is connected to the suspension member 40 from a lower side of the suspension member 40 via bushings 16 by brackets (clamp).

The suspension member 40 is made of a sub-frame arranged in a well state in plan view. The suspension member 40 is a highly rigid member where the engine is mounted. Other than the stabilizer 10, as usual, the lower arm 50 or the steering device 30 is fixed to the suspension member 40. See FIG. 2 and FIG. 4.

In the example shown in FIG. 4, the steering device 30 is a rack-and-pinion type steering device. A gear box 32 is connected and fixed to the upper side of the suspension member 40 via the bushing or the like by a bolt. The gear box 32 receives the meshing portion of a pinion gear and a rack shaft (not shown).

The vicinities of right and left end parts of the suspension member 40 are fixed to and supported by corresponding front side members 70 via pipe-shaped members 76 (See FIG. 2) extending in upper and lower directions. See FIG. 1 and FIG. 3. At right and left sides of the automobile, the front side member 70 is a framework member extending in automobile front and rear directions inside of (inboard of) the corresponding suspension devices 20.

In this example, the stabilizer 10 passes right under the gear box 32 (slightly to the front of the gear box 32) of the steering device 30 and extends in the right and left directions at the front of the rack shaft (and tie rod) of the steering device 30. Under this structure, an arm length for torsion moment of the stabilizer 10 can be shortened so that an efficient arrangement of the stabilizer 10 can be made.

The structure of (2) is well shown in FIG. 1, FIG. 2, and FIG. 3. More specifically, as discussed above, the stabilizer 10 extending right and left passes over right and left end parts of the suspension member 40 and passes over the lower arm 50 as shown in FIG. 1 and FIG. 3 so as to extend toward the front of the automobile as shown in FIG. 2. In other words, in a vicinity of a side end part of the suspension member 40, where the alignment direction of the stabilizer 10 is changed from the right and left directions of the automobile to the front and rear directions of the automobile, the stabilizer is offset upward so as to be beyond the upper part of the lower arm 50. In addition, as shown in FIG. 2, the stabilizer 10 passes below the lower part of the drive shaft 60. In other words, the stabilizer 10 passes through a part between the drive shaft 60 and the lower arm 50 so as to extend to the front of the center of the axle of the wheel (front part of the axle). Since the direction of the stabilizer 10 is changed from the right and left directions of the automobile to the front and rear directions of the automobile, the stabilizer in plan view has a rectangular shape without one side. An arm part is formed by change in directions so as to be able to apply torsion moment to a substantially straight bar part 12 of the stabilizer 10 extending in the right and left directions of the automobile.

In this example, the lower arm 50 has an L-shape. The lower arm 50 is connected to the suspension member 40 via bushings at two points in the front and rear directions of the automobile. In this case, as shown in FIG. 2 in plan view, the stabilizer 10 appears from a lower part of the suspension member 40 to a part between two connection points in the front and rear directions of the automobile at the side of the suspension member 40. The stabilizer 10 passes inside of (inboard of) the tube shaped member 76 so as to pass over the lower arm 50 (front arm area) and extend to the front part of the automobile.

The structure of (3) is well shown in FIG. 1, FIG. 2, and FIG. 3. More specifically, as discussed above, an end part of the stabilizer passing over the lower arm 50 and extending to the front part of the automobile is connected to the strut 22 of the suspension device 20 (a shell of a shock absorber in this example) via the stabilizer link 14. In addition, the stabilizer 10 extends to the front of the center of the axle of the wheel (front part of the axle). The stabilizer 10 is connected to a front part of the strut 22 of the suspension device 20 via the stabilizer link 14. Because of this, as discussed above, it is possible and easy to secure a necessary arm length of the stabilizer 10 even under the structure where the stabilizer passes in front of the gear box 32.

In this example, the lower end of the stabilizer link 14 is connected to an end part of the stabilizer bar 12 extending to the front of the center of the axle of the wheel (front part of the axle), in a position slightly higher than the lower arm 50. The upper end of the stabilizer link 14 is arranged at the front of the shaft of the strut 22.

In addition, the suspension device 20 forming a strut type suspension has a strut 22, a spring coil 24 and the lower arm 50. The upper end of the strut 22 is rotatably connected to the automobile body via the bearing. The lower end of the strut 22 is fixed to a knuckle 80. The spring coil 24 is provided so as to be wound with respect to the strut 22. The lower arm 50 is connected to the knuckle 80 via a ball joint.

In this embodiment, because of the above-discussed specific structure, there is no limitation between the stabilizer 10 and the engine and the transmission and no limitation between the stabilizer 10 and the front side member 70. Therefore, it is possible to efficiently form the stabilizer 10. An effect of the embodiment of the present invention is discussed with reference to FIG. 5.

Figure 5:
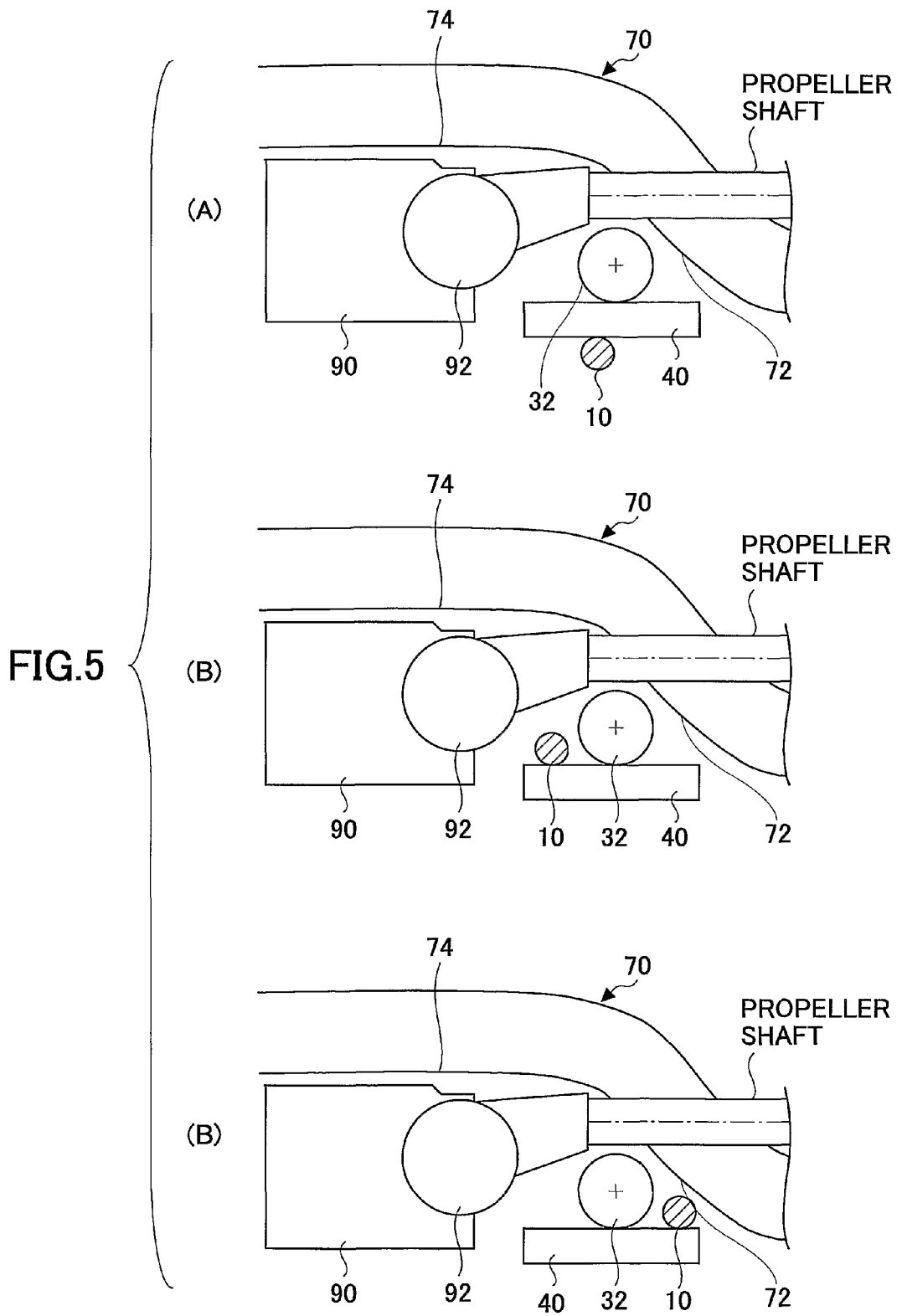
FIG. 5 is a view for explaining a limitation generated due to a positional relationship between the stabilizer 10 and the peripheral main parts, and a decrease or removal of the limitation.

FIG. 5 is a schematic side view showing relationships between the stabilizer 10 and the engine 90 and the transmission 92 and relationships between the stabilizer 10 and the front side member 70. FIG. 5-(A) shows a structure of this embodiment. FIG. 5-(B) shows, for the purpose of comparison, a structure where the stabilizer 10 passes in front of the gear box 32. FIG. 5-(C) shows, for the purpose of comparison, a structure where stabilizer 10 passes to the rear of the gear box 32.

In the structure shown in FIG. 5-(B), since the stabilizer 10 passes in front of the gear box 32, the layout of the stabilizer 10 is limited due to the relationship between the transmission 92 and the engine 90 situated in front of the gear box (and a transfer in a case of a four-wheel drive car).

On the other hand, according to the embodiment of the present invention, as shown in FIG. 5-(A), since the stabilizer 10 passes under the suspension member 40, because of upper and lower positional relationships of the suspension member 40, the engine 90 and the transmission 92, in other words, because of the engine 90 and the transmission 92 being situated in a position higher than the suspension member 40, the stabilizer 10 does not limit the positions of the engine 90 and the transmission 92. In addition, since the stabilizer 10 passes under the suspension member 40, the degree of freedom of design of front and rear positions of the stabilizer 10 is increased. By adjusting the front and rear positions of the stabilizer 10, the arrangement of other peripheral parts can be improved.

In the structure shown in FIG. 5-(C), while the relationships among the stabilizer 10, the engine 90 and the transmission 92 do not give limitations to the layout of the stabilizer 10, the relationship between the stabilizer 10 and the front side member 70 gives a limitation of the layout of the stabilizer 10. In other words, in the structure shown in FIG. 5-(C), in the periphery of the bending part 72 (See FIG. 1) bent to the lower part of the front side member 70, the stabilizer 10 crosses the lower part of the front side member 70 in the right and left directions of the automobile. Therefore, in order to keep clearance necessary for the stabilizer 10 and the front side member 70 in an area where the stabilizer 10 crosses the lower part of the suspension member 70, it is necessary to make the bending radius of the bending part 72 of the front side member 70 large and this is disadvantageous from the perspective of strength and rigidity.

On the other hand, according to the embodiment of the present invention, while the stabilizer 10 keeps necessary clearance for the lower arm 50, the stabilizer 10 passes above the lower arm 50 and crosses the front side member 70 in the right and left directions of the automobile. Therefore, there is sufficient clearance between the movable range of the stabilizer 10 and the front side member 70. Hence, it is possible to design the bending part 72 of the front side member 70 without limitation due to the stabilizer 10 and give the desirable strength and the rigidity to the front side member 70.

In addition, as shown in FIG. 2 (the front side member 70 is virtually shown by two-dot lines.), at a front part of the bending part 72 of the front side member 70, the stabilizer 10 crosses the front side member 70 in the right and left directions of the automobile. In other words, the stabilizer 70 crosses the lower part of the straight part 74 situated at the front of the bending part 72 of the front side member 70 in the right and left directions of the automobile. Hence, there is sufficient clearance between the movable range of the stabilizer 10 and the front side member 70. Hence, it is possible to design the bending part 72 of the front side member 70 without limitation due to the stabilizer 10.

In addition, in this embodiment of the present invention, as shown in FIG. 1, the stabilizer 10 extends in the right and left directions of the automobile in a position of the front and rear directions of the automobile corresponding to the bending part 72 of the front side member 70. The stabilizer 10 extends toward the front of the automobile in the end parts of the right and left directions, passing under the front side member 70, and is connected to the strut 22 of the suspension devices 20 situated outside of the corresponding front side members 70. Thus, since the stabilizer 10 of this embodiment of the present invention passes above the lower arm 50 and extends toward the front of the automobile, while the design degree of freedom of the front and rear positions of the stabilizer 10 under the suspension member 40 is kept, it is possible to extend the stabilizer 10 to the outside of the automobile without crossing the bending part 72 of the front side member 70. For example, in the above-discussed embodiment of the present invention, since the stabilizer 10 passes in front part of the gear box 32 under the suspension member 40, it is possible to easily extend the stabilizer 10 to the outside of the automobile without crossing the bending part 72 of the front side member 70. Even if the stabilizer 10 crosses behind the gear box 32, by extending the stabilizer 10 toward the front part of the automobile in an area inside of the front side member in the right and left directions in a side area of the suspension member 40, it is possible to extend the stabilizer to the outsize of the automobile without crossing the bending part 72 of the front side member 70.

As discussed above, according to the embodiment of the present invention, the stabilizer 10 can be efficiently laid out with little limitation to the peripheral main parts.

The present invention is not limited to the above-discussed embodiments, but variations and modifications may be made without departing from the scope of the present invention.

For example, as discussed above, one of the specific features of the embodiment of the present invention is mainly the arrangement way of the stabilizer. Hence, there is no limitation in a structure itself or an additional function of the stabilizer 10. For example, the stabilizer 10 may be an active type stabilizer having an actuator.

While the lower arm 50 is used in the above-discussed embodiment of the present invention, the present invention is not limited to an L-shaped lower arm. For example, the present invention can be applied to a double link type lower arm.

Figure 6:
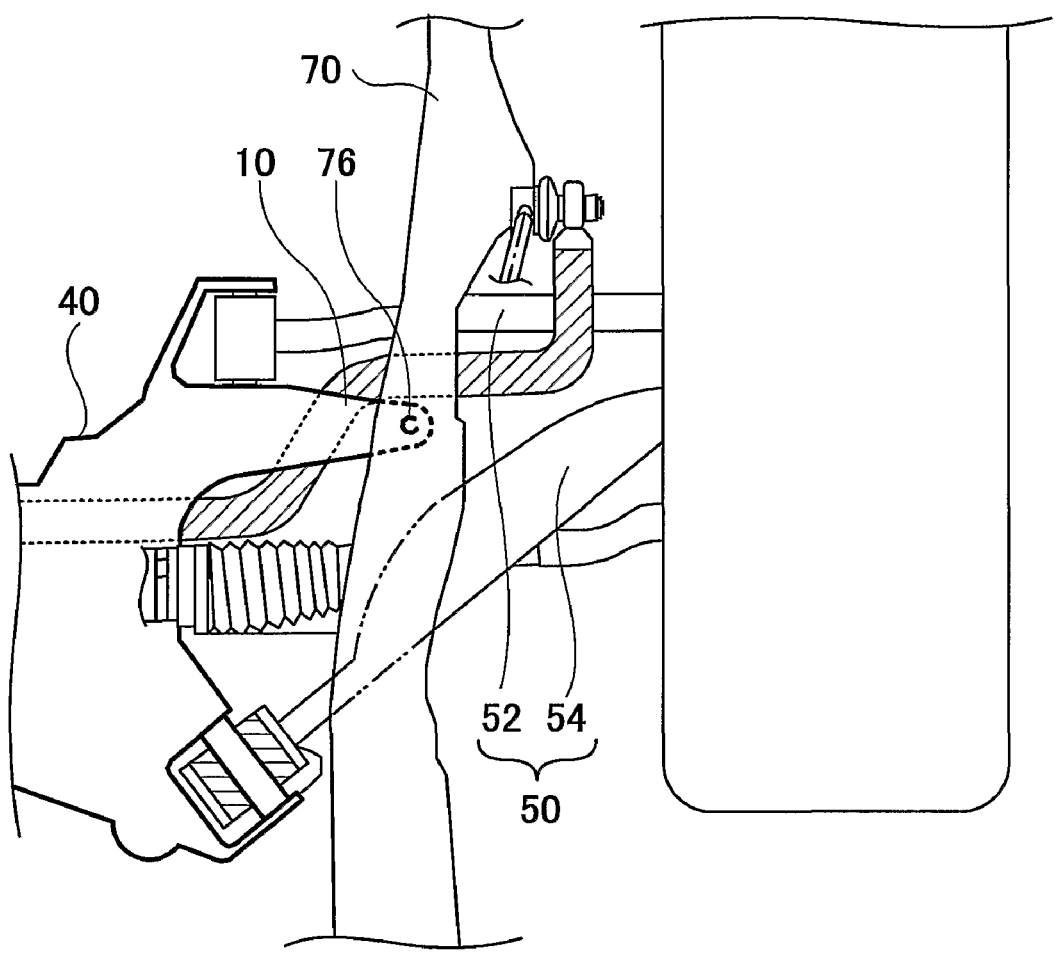
FIG. 6 is a plan view showing an example where the stabilizer is applied to a double-link type lower arm 50.

In this case, as shown in FIG. 6, the stabilizer 10 may extend from below the suspension part 40 to pass between the first arm 52 and the second arm 54 at the side of the suspension member 40, may pass over an upper part of the first arm 52, and may extend toward the front of the automobile.

In addition, while the above-discussed embodiment of the present invention is related to the strut type suspension, the present invention is not limited to this. The present invention may be applied to other types of the suspensions such as a multi-link type suspension like a double wishbone type suspension.

Furthermore, while the upper end of the stabilizer link 14 of the stabilizer 10 is connected to the strut 22 in the above-discussed embodiment of the present invention, the present invention is not limited to this. As long as a member can provide a connection part at the same position, the member may be connected to another member.

As discussed above, according to the above-discussed embodiment of the present invention, it is possible to provide a stabilizer configured to connect suspension devices situated right and left of an automobile, characterized in that: the stabilizer extends below a suspension member where a steering device of the automobile is fixed; at a side of the suspension member, the stabilizer extends above a lower arm and toward a front of the automobile; and the stabilizer is connected to the suspension devices.

The stabilizer may be characterized in that: at the side of the suspension member, the stabilizer extends toward the front of the automobile more than a center of an axle shaft of the automobile; and the stabilizer is connected to a front side part of a strut of the suspension device via a link member. The stabilizer may be characterized in that the stabilizer passes substantially right under a gear box of the steering device or toward the front side of the automobile.

The stabilizer may be characterized in that at right and left sides of the automobile, the stabilizer crosses corresponding frame members extending in front and rear directions of the automobile inside of the corresponding suspension devices, the stabilizer extending in right and left directions of the automobile. The stabilizer may be characterized in that at a front part of a bending part of the frame member, the stabilizer crosses a lower part of the frame member, the stabilizer extending in the right and left directions of the automobile. The stabilizer may be characterized in that the lower arm has an L-shaped configuration.

The stabilizer may be characterized in that: the lower arm is a double link type lower arm; and the stabilizer extends from below the suspension part to pass between a first arm and a second arm at the side of the suspension member, passes over an upper part of the first arm, and extends toward the front of the automobile.

This patent application is based on Japanese Priority Patent Application No. 2005-262326 filed on Sep. 9, 2005, and the entire contents of which are hereby incorporated by reference.

The invention claimed is:

1. A stabilizer that connects suspension devices situated right and left of an automobile, wherein
   the stabilizer extends below a suspension member where a steering device of the automobile is fixed;
   at a side of the suspension member, the stabilizer extends between a lower arm and the suspension member and toward a front of the automobile;
   the stabilizer is connected to the suspension devices;
   the lower arm has no hole through which the stabilizer extends; and
   the steering device includes a tie rod and the stabilizer is disposed below the tie rod.

2. The stabilizer as claimed in claim 1, wherein:
   at the side of the suspension member, the stabilizer extends toward the front of the automobile more than a center of a drive shaft of the automobile; and
   the stabilizer is connected to a front side part of a strut of the suspension device via a link member.

3. The stabilizer as claimed in claim 1, wherein:
   the stabilizer passes substantially directly under a gear box of the steering device or toward the front side of the automobile.

4. The stabilizer as claimed in claim 1, wherein:
   at right and left sides of the automobile, the stabilizer crosses corresponding frame members extending in front and rear directions of the automobile inside of the corresponding suspension devices, the stabilizer extending in right and left directions of the automobile.

5. The stabilizer as claimed in claim 4, wherein:
   at a front part of a bending part of the frame member, the stabilizer crosses a lower part of the frame member, the stabilizer extending in the right and left directions of the automobile.

6. The stabilizer as claimed in claim 4, wherein:
   the lower arm has an L-shaped configuration.

7. The stabilizer as claimed in claim 1, wherein:
   the lower arm is a double link type lower arm; and
   the stabilizer extends from below the suspension member to pass between a first arm and a second arm at the side of the suspension member, passes over an upper part of the first arm, and extends toward the front of the automobile.

8. A stabilizer that connects suspension devices situated right and left of an automobile, comprising:
   a first portion of the stabilizer that extends in a transverse direction of the automobile, the first portion of the stabilizer being disposed below a suspension member where a steering device of the automobile is fixed; and
   a second portion of the stabilizer extends towards a front end of the automobile in a longitudinal direction of the automobile, the second portion of the stabilizer being disposed above a lower arm at a side of the suspension member and extends beyond the lower arm in the longitudinal direction of the automobile,
   wherein the stabilizer is connected to the suspension devices, and
   wherein the steering device includes a tie rod and the first portion of the stabilizer is disposed below the tie rod.

9. The stabilizer as claimed in claim 8, wherein:
   at the side of the suspension member, the second portion of the stabilizer extends towards the front end of the automobile beyond a center of a drive shaft of the automobile in the longitudinal direction of the automobile; and
   the stabilizer is connected to a front side part of a strut of the suspension device via a link member such that a first end of the link member is adjacent to an end of the second portion of the stabilizer and a second end of the link member is adjacent to the front side part of the strut.

10. The stabilizer as claimed in claim 9, wherein ball joints are disposed at the first and second ends of the link member.

11. The stabilizer as claimed in claim 8, wherein:
    at right and left sides of the automobile, the stabilizer crosses corresponding frame members extending in the longitudinal direction of the automobile inside of the corresponding suspension devices, the stabilizer extending in the transverse direction of the automobile.

12. The stabilizer as claimed in claim 8, wherein the first portion of the stabilizer passes through a concave part disposed at a lower side of the suspension member.

13. The stabilizer as claimed in claim 8, wherein the stabilizer is connected to the suspension member from a lower side of the suspension member via bushings by brackets near right and left ends of the suspension member.

* * * * *